Figure 4:
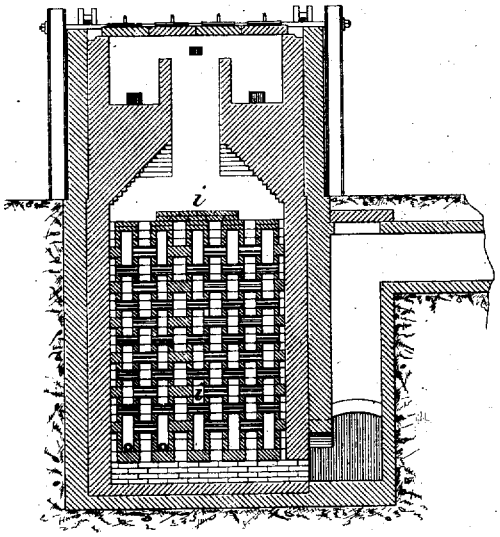

2 Sheets—Sheet 1.
A. PONSARD,
Assignor to W. SELLERS.
FURNACE FOR GENERATING AND BURNING GASEOUS FUEL.
No. 9,896.
Reissued Oct. 18, 1881.
— Fig. 1. —
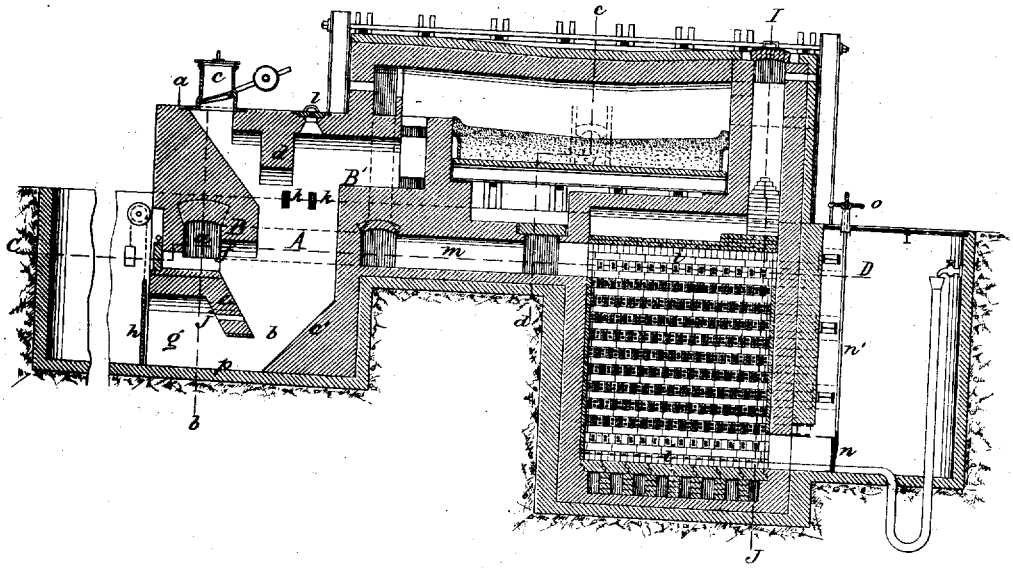
— Fig. 2. —
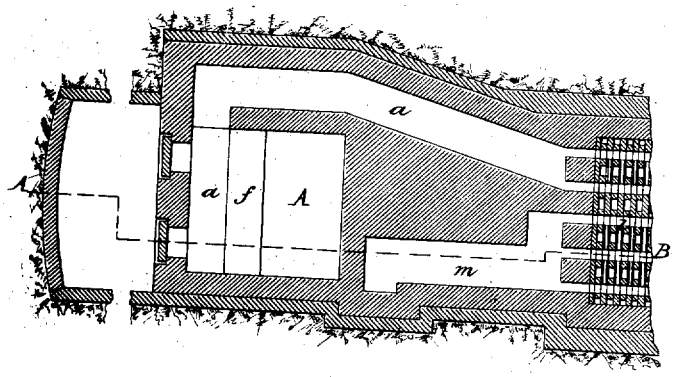
— Fig. 3. —
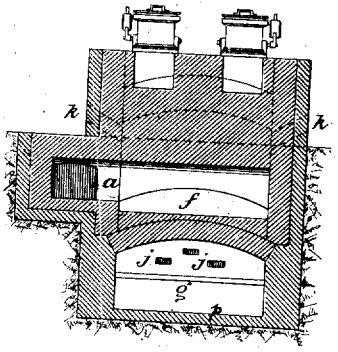
Witnesses.
J. Walter Douglass
J. Prowden Bell.
Inventor:
A. Ponsard.
by Henry Baldwin Jr.
Atty.

2 Sheets—Sheet 2.

A. PONSARD,

Assignor to W. SELLERS.

FURNACE FOR GENERATING AND BURNING GASEOUS FUEL.

No. 9,896. Reissued Oct. 18, 1881.

*Witnesses:*
J. Walter Douglass
J. Gordon Bell

*Inventor:*
A. Ponsard.
by Henry Baldwin
Atty.

UNITED STATES PATENT OFFICE.

AUGUSTE PONSARD, OF PARIS, FRANCE, ASSIGNOR TO WILLIAM SELLERS, OF PHILADELPHIA, PENNSYLVANIA.

FURNACE FOR GENERATING AND BURNING GASEOUS FUEL.

SPECIFICATION forming part of Reissued Letters Patent No. 9,896, dated October 18, 1881.

Original No. 163,247, dated May 11, 1875. Application for reissue filed December 4, 1878.

DIVISION A.

*To all whom it may concern:*

Be it known that I, AUGUSTE PONSARD, of the city of Paris, in the Republic of France, have invented certain new and useful Improvements in Furnaces for Generating and Burning Gaseous Fuel, of which improvements the following is a specification.

It is the object of my invention to increase the production of carbonic oxide from a given quantity of fuel; to produce this gas at the highest possible temperature, so as (without passing it through any recuperator or regenerator) to introduce it at the highest possible temperature to the furnace in which it is to be consumed; to support the combustion of this gas by the introduction to the furnace of air previously heated by the waste products of combustion, and to simplify the apparatus required for the production and consumption of gaseous fuel, while attaining a higher heat than has heretofore been obtained therefrom.

Previous to my invention, when the highest heats from gaseous fuel have been required, it has been necessary that the temperature of the gas should be raised before its introduction to the furnace for combustion, not only because it could not be produced at a sufficiently high temperature, but because much of its original heat had been lost in its passages from the producer to the furnace, in most instances widely separated. In that system the expense of the apparatus is increased, not only by the cost of the separate structures, but by the means required to connect them; and as the more volatile particles of the gas are deposited in passing from the producer toward the furnace, and in restoring the heat by the recuperator the gas deposits another portion upon the recuperator, this operation is attended with a constant waste of fuel.

My invention consists, first, in supporting the combustion of the gas-producing fuel by supplying it with a continuous current of highly-heated air, and so regulating this supply as to control the activity of the combustion; second, in defining the traverse of this air, and the gas produced thereby, so that the gas shall pass off at the highest temperature; and, third, in effecting an intense combustion by the introduction to this gas, as it passes to the furnace, of air previously heated by the waste products of combustion.

At the ordinary temperature of the atmosphere the air and the fuel for the production of carbonic-oxide gas will not combine with sufficient rapidity to produce sensible heat. The rapidity of their combination and the intensity of the resultant heat are probably in proportion to the temperature of the two, respectively, previous to their combination.

In gas-producers, as heretofore constructed, the gas-producing fuel performs two functions—first, to heat the air and the fuel to a sufficient temperature to continue an active combustion, producing carbonic-acid gas, and, second, to heat the remaining fuel to such a degree that a slower combustion without flame will take place, in which the carbonic acid should take up another charge of carbon and become carbonic oxide; but in all such producers a portion of the carbonic acid will pass through without taking up another charge of carbon. Now, if the air which is to support the primary combustion should be so heated that none of the heat from the fuel would be required for the primary conditions, the carbonic acid would be produced at a much higher temperature, and its liability to pass through the remaining fuel without taking up another charge of carbon would be diminished, so that the product of carbonic oxide from a given quantity of fuel would be greater than has heretofore been obtained. Moreover, the air coming to the fuel heated, instead of to be heated, not only promotes the combustion of the fuel and the production of carbonic oxide, but it also intensifies the temperature of this gas by the direct contribution of heat instead of abstracting it, as heretofore.

It must be borne in mind that the consumption of fuel at any temperature, however high, will be proportioned to the quantity of air admitted to combine with it, so that while the quantity of air admitted is kept within the limits which must be observed to prevent a too active combustion, the result obtained will be an increased quantity of carbonic oxide at a higher temperature than has heretofore been possible.

In the accompanying drawings, which form part of this specification, I have shown an improved apparatus in which the operation of my invention is exemplified.

Figure 5:
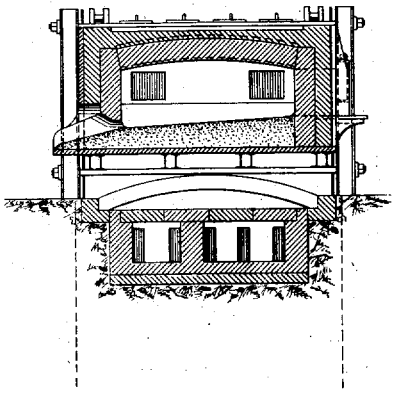
Figure 6:
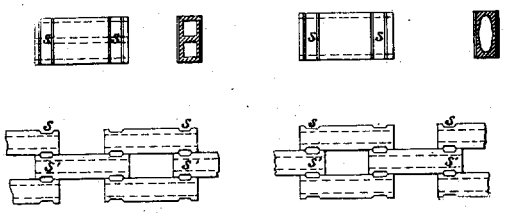

Figure 1 represents a vertical longitudinal section of my improved apparatus applied to a heating-furnace, line of A B, Fig. 2. Fig. 2 is a horizontal section thereof, following the line C D, Fig. 1. Fig. 3 is a vertical transverse section on the line *a b*, Fig. 1. Fig. 4 is a vertical transverse section on the line I J, Fig. 1. Fig. 5 is a vertical transverse section, on the line *c d*, Fig. 1. Fig. 6 represents, in detail and upon an enlarged scale, the hollow bricks which I use and the manner in which they are put together in the recuperator. The principal feature in their construction is the recessed ends *s*, which, when in position, as at *s' s'*, form chambers in which fire-clay can be packed so as to form a key to hold the structure together, as well as an interruption to the passage of gas and air at the joint. This general arrangement of the recuperator is the same as described in Letters Patent of the United States, No. 130,313, granted to me August 6, 1872; but in this instance, in order to tie together the vertical division-walls between the passages for air and waste products, and also to cut off the straight joints in these division-walls, I provide the bricks with recessed ends, so as to form at these ends chambers in which the fire-clay can be packed so as to constitute keys to hold the structure together, as already mentioned.

The gas-producer consists of a rectangular chamber, A, the lower part, *b*, of which is greatly contracted, in order that the residuum of the fuel (cinders and slag) in the contracted space *b* may be easily removed with stoking-irons. The fuel is charged through the hopper and clap-valve *c*, and the arch *d* serves to limit its height in the chamber A. The fuel is supported by the hearth *p*, upon which the cinders and slag will accumulate, and from which they may be removed, as hereinafter described. The lower portion of the chamber A terminates in two inclined planes, *e e'*, one of which, *e*, extends down to a certain distance above the hearth in such manner that raking-bars may be easily inserted into the openings thus provided to loosen and remove the ashes and cinders accumulating in this portion of the producer. Above the inclined plane *e* the upper interior front wall of the producer is supported upon the arch B, which extends nearly the length of the producer. The hot air is brought from the recuperator *i* to the front of the producer through the conduit *a*, and reaches the fuel under the arch B through the opening *f*, which takes up nearly the whole width of the chamber A. The under side of the arch B will define the height at which the air can have access to the fuel. The gas is taken off between the under side of the arch *d* and the top of the back wall of the producer B', and the position of these in relation to the under side of the arch B will define the traverse of the air and gas through the fuel and compel the gas to pass off from the hottest part of the producer. In this producer the traverse of the air and gas is upon an ascending plane.

The ash-pit *g* can be closed by means of vertically-sliding doors of sheet-iron, *h*, which are raised by means of counter-weights; or it may remain open if the pressure of the hot air entering the producer is not great enough to force back the gas through this part of the apparatus. To prevent the loss of gas which might result from its driving back under pressure the sliding doors may, after each clearing of the pit, be luted with ashes, earth, or sand.

In the front wall of the contracted portion *b* of the producer, above the arch of the ash-pit, openings *j* are provided, through which stoking-irons may be introduced to lift and stir the fuel and to remove the ashes and slag to the lower part of the apparatus. Through the openings *j* bars may be inserted to sustain fuel above the hearth and within the producer, while the ashes, cinders, or slag are being removed from the hearth *p* beneath the bars. In the side walls of the producer are also provided openings *k*, which, together with the sight-holes *l*, arranged in the arch, allow the introduction of stoking-irons to compact the fuel and to break up any arches that may be formed by the agglomeration of coal, especially if a rich kind of coal is used.

The recuperator *i* is divided into two parts, one of which serves to heat the air required to support combustion in the producer, and the other to heat the air for the combustion of the gas as it enters the furnace by means of the passage *m*; and these divisions are subdivided by the passages for the outgoing products of combustion. This division of the recuperator into two distinct parts may be made complete or partial only—in other words, they may be entirely separated by a solid wall, or the transverse air-passages only may be filled up (divided) by solid brick, separating the passages for the incoming air, but leaving the subdividing-passages common to the products of combustion. This latter disposition is represented in the drawings, and particularly claimed hereinafter. Whatever arrangement may be adopted, independent valves must be placed before each group of orifices for the admission of air into the divided recuperator, to regulate the quantity of air admitted to the producer as well as to the furnace. In the drawings the position of these valves is represented at *n*, Fig. 1, in the rear of the recuperator, and they are operated by screwed rods *n'* and hand-wheels *o*.

With a view to obtain the maximum advantages of my improved system, hereinbefore described, I contemplate varying, under varying circumstances, the construction of the producer, with the view in all cases to admit the air above the hearth, to define its traverse through the fuel, and to carry off the carbonic oxide from that section of the producer where this gas is the hottest.

In another division of this reissue I have more particularly described and claimed the improved construction of the producer by which I effect this operation; but such construction does not form any part of the improvements herein claimed.

The air which supports combustion in the gas-producer acquires the force necessary to enter the producer from the heat which it receives in passing through the recuperator; but it may also be injected either by means of a blower, or by a jet of steam, or by a blast-engine of any kind. Of these methods I prefer to employ the jet of steam, because the steam, in passing through the fuel, is decomposed and produces a gas rich in carbon. I obtain this result, when the air is not forced, by admitting into the lower part of the recuperator a small quantity of water by means of an iron tube, which is inserted into the air-inlet, as shown in Fig. 1. This water is vaporized in the iron tube and escapes as steam into the recuperator.

I am aware that a gas-producer has been described, in the operation of which previously-heated air was introduced to support the combustion of the gas-producing fuel. Two regenerators and conduits alternately carried a current of air to and a current of gas from the producer, and these currents were reversed for the purpose of heating the air, but with the effect of cooling the gas. Each conduit and regenerator therefore was alternately filled with gas or with air, so that with each reversal of the currents the gas contained in the one was returned through the fuel, while the air contained in the other was delivered into the flue leading to the furnace, where it would mix with and deteriorate the quality of the gas. In this case the length of the flue to the furnace permitted an admixture; but with a delivery directly into the furnace, such as I contemplate and set forth, the flame would be extinguished and its place supplied by a blast of heated air alone at each alternation, which would not only diminish the heat but oxidize the contents of the furnace.

Having thus described my invention, what I claim as new, and desire to secure by Letters Patent, is—

1. The combination, substantially as hereinbefore set forth, of a gas-producer, a furnace, a recuperator through which the air is supplied which supports the combustion in the gas-producer, and a recuperator through which the air is supplied which supports the combustion in the furnace.

2. The combination, with the gas-producer, the furnace, and the divided recuperator, of the independent valves for regulating separately the supplies of air to the producer and to the furnace, substantially as described.

3. A recuperator divided as to the incoming and outgoing air, these divisions being subdivided by passages which are common to the outgoing products of combustion, substantially as and for the purposes described.

4. The division-walls built up of bricks, provided with recesses in the ends, which recesses cut off the straight joint in the walls and form chambers which are packed with fire-clay to key the walls together and bar the passage of air or gas, substantially as described.

AU. PONSARD.

Witnesses:

ROBT. M. HOOPER,

A. GALLAIR.